Jan. 21, 1964 R. T. KEATING 3,118,436
OVEN CONSTRUCTION
Filed Oct. 10, 1962
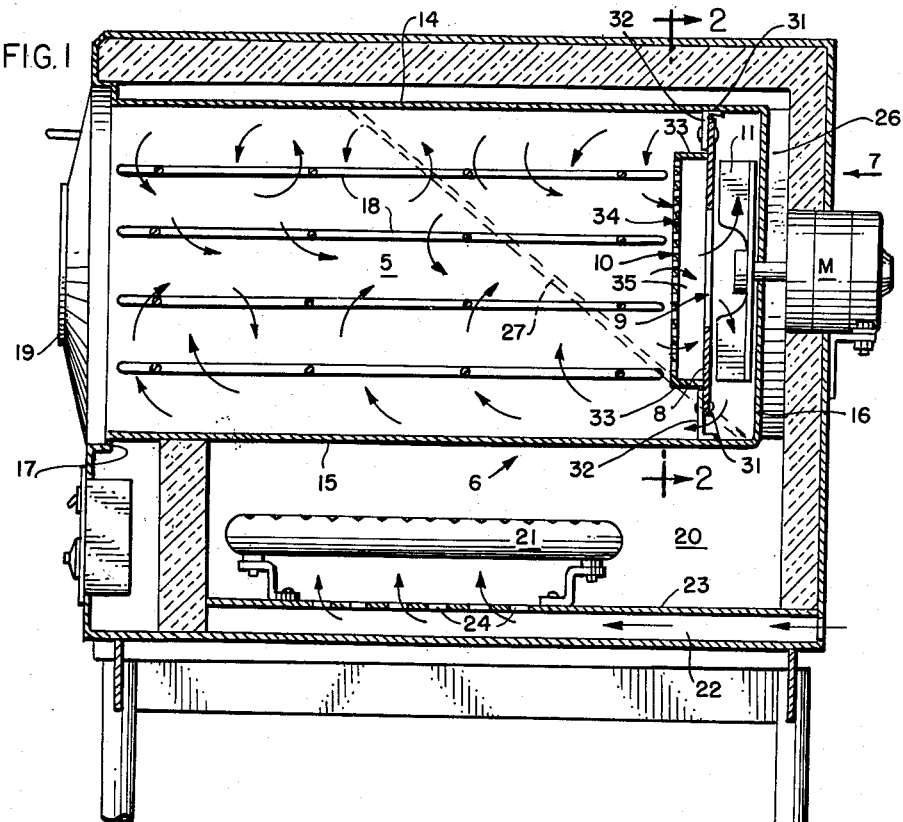
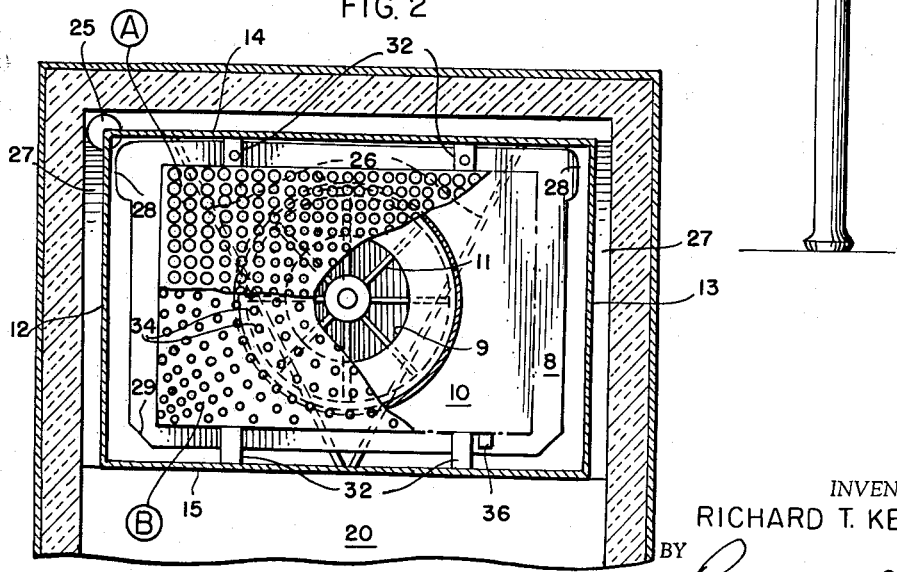
INVENTOR:
RICHARD T. KEATING
BY
ATT'YS

3,118,436
OVEN CONSTRUCTION
Richard T. Keating, 144 N. Cuyler Ave., Oak Park, Ill.
Filed Oct. 10, 1962, Ser. No. 229,533
7 Claims. (Cl. 126—19)

This invention relates to the structuring of closed or recirculating-air ovens for use in the cooking of food products.

In the cooking of food products, such as meats, and those made of grain-flour doughs, the problem has been to achieve a uniform internal cooking, an acceptable external coloration, and the least loss of moisture content with a minimum use of heat during the least lapse of time.

The main objects of this invention are to provide an improved internal construction of an oven for use in roasting and baking various kinds of food products; to provide an improved internal oven construction for creating such a turbulent air flow throughout the cooking chamber as to cause the conveyance of heat to the foods more by convection than by either radiation or incidental conduction; to provide such an oven construction wherein the conveyance of heat to the foods will occur at substantially the same rate in all parts of the cooking space of the oven interior; and to provide an internal oven construction of this kind having an improved motor-driven fan and baffle arrangement for ensuring a more uniform cooking of the food products throughout the oven interior, at temperatures lower than those conventionally dictated, with a less loss of moisture content, and with the attainment of a consistently superior coloration than heretofore obtainable.

In the adaptation shown in the accompanying drawings:

FIGURE 1 is a vertical, sectional view of an oven constructed in accordance with this invention; and FIG. 2 is a transverse, sectional view of the same taken on the plane of the line 2—2 of FIG. 1.

The essential concept of this invention involves a closed cooking chamber the air in which is turbulently circulated by a fan driving the air over the sharp edge of a baffle plate disposed parallel with the plane of rotation of the fan impeller and having a central opening for the return of the air from the chamber to the fan and includes providing a perforate-mask for the baffle plate opening which mask is made with perforations of predetermined size and distribution so that the air flow in the rearward or return direction in the oven will be so balanced over the transverse cross sectional area of the oven that the heat transfer rate to the product being cooked will be substantially uniform throughout the cooking chamber.

An oven construction embodying the foregoing concept comprises an enclosed cooking chamber 5, defined by the walls of a cabinet 6 mounted within an insulating housing 7, at one end of which chamber 5 is arranged a transverse baffle 8 having a central opening 9 over which is positioned a perforate mask 10 and through which air from the chamber 5 is drawn by a motor-driven fan or impeller 11 and so directed around the baffle 8 back into the chamber as to cause a constant highly turbulent circulation of the air throughout the chamber 5.

The ratio of dimensions between the cooking chamber 5 and that of the baffle 8 and the perforate mask 10 and the positioning of the baffle 8 in the chamber 5 have been found to be somewhat determinative of the best cooking results. As an example of such ratio, approximate dimensions herein are indicated for the particular oven construction illustrated in the drawing.

The cooking chamber 5 comprises all of the interior of the metal cabinet 6, defined by the side walls 12 and 13, the top and bottom walls 14 and 14 and the rear and front walls 16 and 17, except the space between the baffle 8 and the rear wall 16. In this particular embodiment the cabinet interior measures 18" high, 27" wide and 30" deep. Within this cooking chamber 5 are arranged the usual racks 18, the number and spacing of which would depend upon he character of cooking to be done.

The cabinet 6 is enclosed in a conventional, insulated housing 7 except for the front wall 17 which mounts a hinged door 19 affording access to the cooking chamber 5. Within the housing 7, below the bottom wall 15 of the cabinet 6, is a combustion chamber 20 enclosing a heating element 21 above a duct 22 supplying ambient air to the combustion chamber 20. As here shown, the heating element 21 is a gas burner and the wall 23, defining the air duct 21, has openings 24 through which the ambient air enters to maintain combustion in he chamber 20 and transfer heat by convection to the cabinet 6.

The side walls 12 and 13, the top wall 14 and the rear end wall 16, of the cabinet 6, are spaced from the opposed walls of the insulated housing 7 to provide a heating chamber surrounding the cabinet 6. Through this heating chamber the products of combustion travel from the combustion chamber 20 to an exhaust outlet port 25 (FIG. 2); and within this cabinet-embracing heating chamber are arranged angular deflectors 26 and 27 respectively along the rear wall 16 and the side walls 12 and 13. These deflectors serve to provide full distribution of the products of combustion over the walls of the cabinet 6.

The baffle 8 is a metal plate of generally rectangular contour with the central opening 9 concentric with the axis of the fan 11, and having upper-corner ears 28 and lower obliquely cut corners 29. The perimetrical edges of the baffle 8 are square-cut, as shown at 31 in FIG. 1, to ensure the most effective turbulation of the air in the cooking chamber 5. A suitable baffle 8 for use with a cooking chamber of the above-noted dimensions, would have median dimensions of approximately 17" x 25½". In the form shown the ears 28 may be approximately ⅜" wide and 3¾" long and, preferably, have slightly rounded corners; and the obliquely cut corners 29 may each subtend a right angle the sides of which measure approximately 1½". The area of such a baffle would be about 89% the area of the transverse oven section, or the rear oven wall.

As shown, the baffle 8 is secured to the cabinet walls by pairs of top and bottom brackets 32 with the top perimeter of the baffle spaced approximately ¼" from the opposed cabinet wall 14, the bottom perimeter of the baffle 8 spaced approximately ¾" from the cabinet bottom wall 15, and with the main portions of the side perimeters of the baffle 8 spaced ¾" from the respective side walls 12 and 13. Thus, the ears 28 have their longer edges spaced approximately ⅜" from the side walls 12 and 13.

The primary reason for this arrangement of the baffle spacing from the oven side walls is to proportion the volume of air entering along the oven walls in substantially direct relation with the temperatures of the respective walls as they are heated by the circulation of the products of combustion generated by the burner 21, thereby keeping the air temperature in the oven substantially uniform throughout.

As shown, the perforate mask 10 is a rectangularly-shaped, pan-like element with perimetrical flanges or walls 33 for bonding the mask 10 centrally to and in forwardly spaced relation with the baffle 8. The apertures 34 are of a predetermined size and number and spread over the entire area of the part of the mask 10 that is parallel to the baffle 8. For the baffle 8, of the above-noted dimensions, the perforate area of the mask 10 measures approximately 13" x 20" and the mask element has a depth of approximately 1½". Thus, the space between the mask 10 and the baffle 8 serves as a suction chamber 35 and the object of the aperture distribution in the mask is to establish a substantially uniform fan suction and air flow, from front to rear of the oven over the cross sectional area of the cooking chamber 5.

With a view to ensuring a substantially uniform return-air flow through the apertures 34, the apertures are preferably so dimensioned and of such a number that the sum of all the aperture areas is not less than the area of the baffle opening 9. To further ensure a uniform rate of return-air flow over the entire face area of the mask, the mask apertures 34 may be progressively increased in size as they are disposed outwardly from those near the center, (as indicated at A in FIG. 2) or, as an alternative, the spacing of the apertures 34 from one another may be decreased outwardly from the center of the mask, (as indicated at B in FIG. 2) or a combination of varying the sizes and the spacing of the apertures may be arranged.

The motor-driven fan 11 is so mounted on the housing 7 as to dispose the impeller within the space between the baffle 8 and the rear wall 16 of the cabinet 6. Operating at a predetermined speed, the fan 11 draws the air from the cooking chamber 5, through the apertures 34 and into the suction chamber 35, which serves to balance the return air flow between the central and side parts of the oven. The air then enters the fan through the baffle opening 9 and is pressured out at a high velocity through the vaying-size spaces between the baffle edges and the respective opposed cabinet walls 12, 13, 14 and 15. Through these spaces the air is discharged into the cooking chamber 5, by making a right angled turn over the square edges of the baffle plate, so as to cause a high state of turbulence as indicated by the arrows in FIG. 1.

The fan capacity is preferably such that the velocity of the air discharged by the fan 11 is in the range of 40 to about 75 f.p.s. (feet per second) as it turns over the sharp, square edges of the baffle 8 and begins its travel along the cabinet walls 12, 13, 14 and 15 toward the front end of cooking chamber 5. Meanwhile, because of the turbulence the air becomes distributed into the oven and drawn back toward the baffle 8 in a substantially uniform manner so that heat transfer from the oven walls to the product being cooked will be about equal in all parts of the oven.

In an oven having the size and the baffle dimensions above set out, and to produce the before mentioned velocity and turbulence, a suitable fan should have a capacity in the range of 800 to 1650 cubic feet per minute against the static pressure of the system.

Many are the proven advantages of an oven construction as herein described, derived largely from the fact that the highly turbulent movement of the continuously recirculated air within the cooking chamber 5 results in the cooking of the foods by the convection transfer of heat rather than by radiation. The increased heat transfer effected by this turbulated flow of air through the cooking chamber 5 also reduces materially the time for cooking over that achieved by other conventional types of cooking equipment. Consequently, there is a materially lessened dehydration of the cooked foods due to the recirculated air becoming quickly saturated and the finished product has a better taste because it retains more of its original moisture. This is especially so with meats. Also, foods cooked in this oven structure and in accordance with its manner of operation have a superior and more uniform coloration which excites a greater aesthetic appeal. And, finally, there is the advantage of economy by virtue of the shortened time for the oven operation over other structures.

Although but one specific embodiment of this invention has been shown and described it will be understood that details of the construction shown may be altered or omitted without departing from the spirit of the invention as defined by the following claims.

I claim:
1. An oven construction comprising,
   (a) a cooking chamber,
   (b) a baffle transversely positioned in the chamber adjacent one end wall thereof in perimetrically-spaced relationship to the chamber side walls and having a central opening therein,
   (c) a perforate mask of substantially greater area than the baffle opening arranged over the said opening in forwardly spaced relation therewith,
   (d) said mask being of lesser area than the baffle and having perimetrical flanges bonded to said baffle and enclosing the space therebetween, and
   (e) a motor-driven fan impeller positioned between the baffle and the one end wall of the chamber, for rotation in a plane parallel therewith, operable for drawing the chamber air through the perforate mask and the baffle opening and then discharging the said air around the baffle perimeter into turbulent circulation throughout the cooking chamber.

2. An oven construction as set forth in claim 1 wherein the sum of the areas of the mask perforations is not less than the area of the baffle opening.

3. An oven construction as set forth in claim 2 wherein the mask perforations more remote from the center of the baffle opening are of increasingly larger size than the mask perforations adjacent the center of the baffle opening.

4. An oven construction as set forth in claim 2 wherein the mask perforations are of substntially uniform size with those more remote from the center of the baffle opening being spaced closer together than the mask perforations adjacent the center of the baffle opening.

5. An oven construction comprising,
   (a) a cooking chamber of rectangular form wholly enclosed within the spaced walls of an insulated housing and heated by convection from hot gases generated in a space directly below the bottom wall of the cooking chamber, said hot gases engaging said bottom wall and being distributed from said space over the side and top walls of the cooking chamber,
   b. A baffle transversely positioned in the cooking, chamber adjacent one end wall thereof and being of rectangular contour with square edges,
      (1) the top edge of said baffle being spaced closer to the opposed chamber wall than is the lower edge,
      (2) the lateral edges of the baffle being spaced from the opposed chamber walls substantially equally,
      (3) the baffle having short integral ears extending outwardly from the respective lateral edges adjacent the upper baffle corners and spaced from the opposed walls of the chamber approximately half the space of the main portions of the lateral edges, and
      (4) the bottom corners of the baffle being cut away at approximately 45 degrees to the respectively opposed corners of the chamber,
   (c) a perforate mask having an area of about two-thirds the area of the baffle
      (1) fixed on the chamber-side of the baffle in spaced relationship therewith and concentrically of the baffle opening,
      (2) the sum of the areas of the perforations being not less than the area of the baffle opening, and
      (3) the mask having peripheral flanges bonded to the baffle and enclosing the space therebetween, and
   (d) a motor-driven fan positioned for rotation between the baffle and the one end wall of the chamber and operable for drawing the chamber air from the space between the mask and the baffle and discharging the air at right angles over the baffle edges and along the surfaces of the chamber walls into turbulent circulation throughout the chamber.

6. An oven construction as set forth in claim 5 wherein the porforate mask is rectangular in contour and the length and width of the mask is less than that of the baffle, and the mask perforations more remote from the axis of the baffle opening are larger than the perforations adjacent the axis of the baffle opening.

7. An oven construction as set forth in claim 5 wherein the perforate mask is rectangular in contour and the length and width of the mask is less than that of the baffle, and the mask perforations are of substantially uniform size with those more remote from the axis of the baffle opening being more closely spaced from each other than the mask perforations adjacent the axis of the baffle opening.

References Cited in the file of this patent
UNITED STATES PATENTS

| | | |
|---|---|---|
| 1,824,747 | De Coriolis | Sept. 22, 1931 |
| 2,168,028 | Harsch | Aug. 1, 1939 |
| 2,412,103 | Spooner | Dec. 3, 1946 |
| 3,074,393 | Keating | Jan. 22, 1963 |

FOREIGN PATENTS

| | | |
|---|---|---|
| 934,357 | France | Jan. 10, 1948 |